Patented Feb. 8, 1949

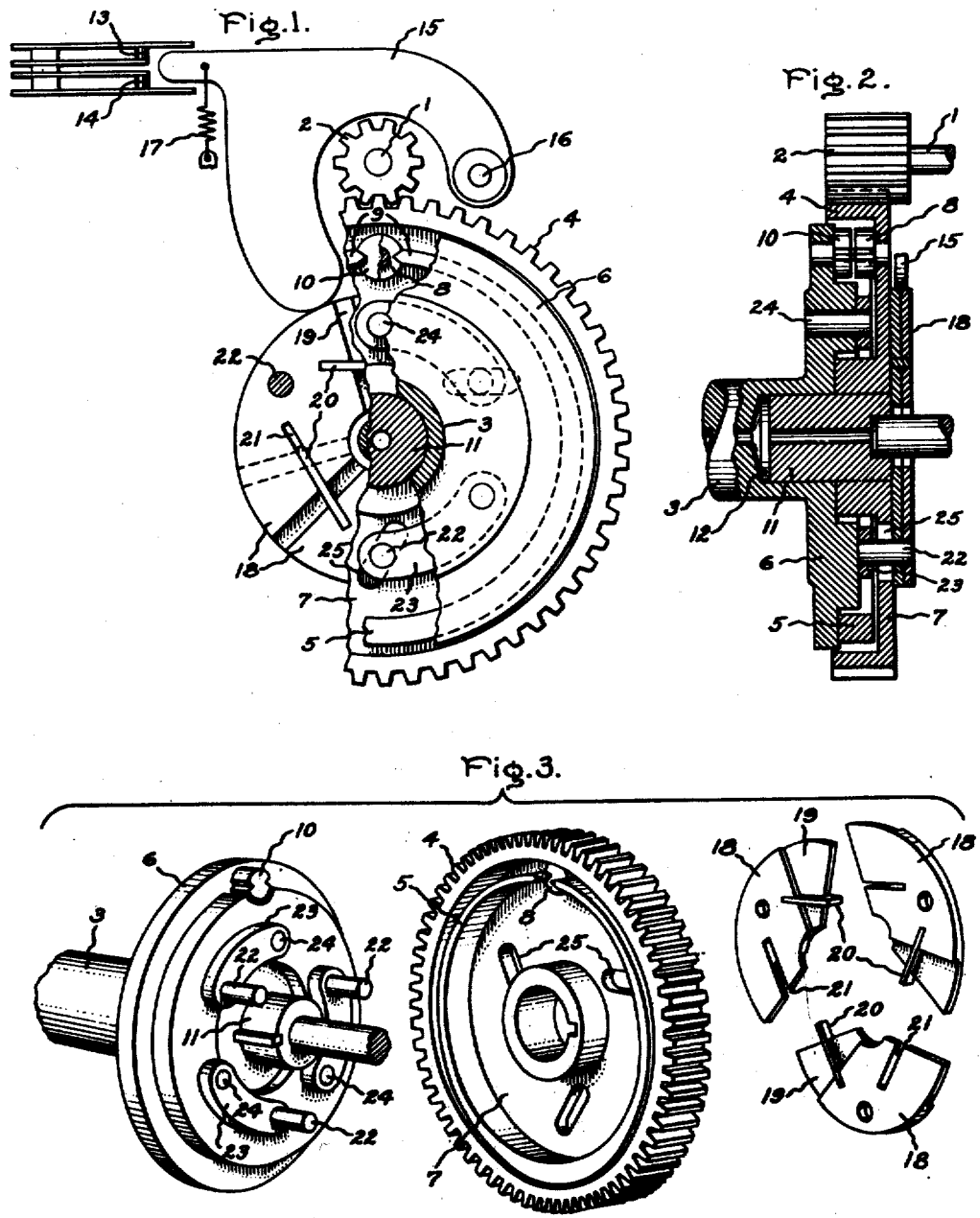

2,461,298

UNITED STATES PATENT OFFICE 2,461,298

COMBINATION COUPLING AND OVERLOAD CAM OPERATED DEVICE

Hugh M. Stephenson, Fort Wayne, Ind., assignor to General Electric Company, a corporation of New York Application October 5, 1944, Serial No. 557,363

12 Claims. (Cl. 192—150)

My invention relates to a coupling overload cam operated device in which a resilient drive is provided between a driving and driven member, such that an overload control device, such as a switch is operated in response to a predetermined relative movement between the driving and driven member resulting from the transmission of an excessive torque therebetween.

An object of my invention is to provide an improved coupling overload switch device.

Another object of my invention is to provide an improved compact coupling overload cam operated device.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an elevational view, partly broken away, of an embodiment of my improved coupling overload cam operated device adapted to operate an overload limit switch; Fig. 2 is a side elevational view, partly in section, of the coupling overload cam operated device shown in Fig. 1; and Fig. 3 is a partially exploded perspective view of the coupling overload cam operated device shown in Figs. 1 and 2.

Referring to the drawing, I have shown an embodiment of my improved coupling overload cam operated device for transmitting torque from a drive member including a drive shaft 1 through a spur gear 2 to a driven member including a driven shaft 3 through a coupling gear 4, an arcuate spring 5, and a driven plate 6. The coupling gear 4 is formed on the outer surface of a drum 7 which is provided with an axially extending engaging member 8 mounted thereon and formed with an axially extending groove on both sides thereof arranged in engagement with the ends 9 of the arcuate spring member 5. This spring is of the type having a radial width which varies directly with the circumferential distance from the midpoint circumferentially thereof, and the spring ends 9 are biased circumferentially apart under a predetermined tension, and are also arranged in engagement with complementary axially extending grooves in a second engaging member 10 substantially in radial alignment with the engaging members 8 mounted on and extending axially from the driven plate 6.

In the illustrated embodiment, a stub shaft 11 extends into an opening 12 in the end of the driven shaft 3 and rotatably supports the driving drum member 7 in axial alignment with the driven member. With this construction, torque is adapted to be transmitted from the drive shaft 1 to the driven shaft 3 through the engaging members 8 and 10 in engagement with the spring 5, and the predetermined tension of the spring 5 maintains the two engaging members 8 and 10 in alignment below a predetermined maximum transmitted torque. However, if the torque transmitted through the spring 5 exceeds a predetermined maximum value, the driven engaging member 10 will tend to lag behind the drive engaging member 8, thereby further increasing the tension in the spring 5 and causing a rotational displacement or movement between the two engaging members 8 and 10, resulting in a further biasing apart of the ends 9 of the spring 5. This relative rotational movement between the drive and driven members of my improved coupling construction is utilized for actuating a limit device for controlling the operation of mechanism connected to the coupling. In the illustrated embodiment of my invention, this limit device comprises a limit switch having two pairs of spaced apart normally closed contacts 13 and 14 which are adapted to be connected in an electrical circuit for controlling the operation of the mechanism, such as the circuit of a drive motor connected to the drive shaft 1 for deenergizing the motor in response to a predetermined relative rotational movement between the two engaging members 8 and 10 corresponding to a predetermined maximum torque transmitted through the coupling. This is obtained by providing a follower 15 which is mounted on a suitable pivotal support 16 and is biased by a suitable spring 17 into engagement with the surface of a cam, the diameter of which is increased or decreased in response to the transmission of a torque exceeding the predetermined maximum safe value. Since torque can be transmitted in either direction through the spring coupling construction, it is necessary that the relative rotational movement of the engaging members 8 and 10 in either direction be such as to operate the actuating arm 15 of the limit switch, and this is obtainable by the provision of a radially expansible diaphragm cam which includes a plurality of radially movable guided segmental diaphragm cam members 18 having complementary sliding guiding surfaces 19 formed on each radial side of each diaphragm segment with adjacent sides thereof in engagement with each other. These diaphragm segments are movable relative to each other and are held in proper relative arrangement by slidable guide elements 20 which are arranged in complementary guide slots 21 extending inwardly from each of the two opposite radial side edges of each diaphragm member to provide for substantially radial movement of the diaphragm members inwardly and outwardly for decreasing and increasing the diameter of the diaphragm cam. This operation of the diaphragm cam is obtained through a linkage which includes guide pins 22 on which the diaphragm members are mounted, and which are secured to links 23 which are pivotally suported by pivot pins 24 secured to the drive plate 6. The guide pins 22 are arranged in angularly extending slots 25 formed in the drum 7 of the coupling gear 3, such that relative rotational movement between the engaging members 8 and 10 causes the guide pins 22 to be moved inwardly or outwardly in the slots 25 and thereby carry the diaphragm segments 18 inwardly or outwardly depending upon the direction of the rotational displacement between the engaging members 8 and 10. In the view shown in Fig. 1, if the driven plate 6 and its engaging member 10 lag in a clockwise direction behind the driving drum 7 engaging member 8 with a counterclockwise rotation of the coupling gear 4, the guide pins 22 will be biased outwardly in the slots 25 and cause the diaphragm segments 18 to move outwardly, thereby increasing the diameter of the diaphragm and causing the switch actuating arm 15 to move upwardly so as to open the switch contact 13. Similarly, if the drive member operates in a clockwise direction, as viewed in Fig. 1, and the maximum torque is exceeded, the driven engaging member 10 will lag in a counterclockwise direction, causing the guide pins 22 to be biased inwardly in the slots 25 in the driving drum member 7, thereby causing the diaphragm segment 18 to be biased inwardly so as to decrease the diameter of the diaphragm cam. This urges the switch actuating arm 15 in a downward direction so as to open the contacts 14. In order to prevent a chattering action of the switch, the switch operating arm 15 is arranged with a given free travel in both directions of its centered position, so that minor changes in the diameter of the diaphragm cam will not cause erratic operation of the switch contacts.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A coupling overload device for transmitting torque in either direction of rotation and for controlling a limit device above a predetermined maximum transmitted torque including a drive member, a driven member, an arcuate spring member having the ends thereof circumferentially spaced apart and arranged under predetermined tension in engagement with said drive member and said driven member for providing a driving connection therebetween through said spring, means including a pivotally mounted operating arm arranged for operating a limit device on actuation thereof, means including a radially expansible diaphragm cam mounted for radial movement outwardly or inwardly on relative rotational movement of said drive and driven members, and means for biasing said operating arm into engagement with said diaphragm cam for operation of a limit device on relative rotational movement between said drive and driven members beyond a predetermined value.

2. A coupling overload device for transmitting torque in either direction of rotation and for controlling a limit device above a predetermined maximum transmitted torque including a drive member, a driven member, an arcuate spring member arranged under predetermined tension in engagement with said drive member and said driven member for providing a driving connection therebetween through said spring and providing for expansion of said spring and relative rotational movement between said drive and driven members above a predetermined maximum transmitted torque, means including a pivotally mounted operating arm arranged for operating a limit device on actuation thereof, means including radially expansible diaphragm cam members mounted for movement outwardly or inwardly on relative rotational movement of said drive and driven members, and means for biasing said operating arm into engagement with said diaphragm cam members for operation of a limit device on relative rotational movement between said drive and driven members beyond a predetermined value.

3. A coupling overload device for transmitting torque in either direction of rotation and for controlling a limit device above a predetermined maximum transmitted torque including a drive member having an axially projecting engaging member thereon, a driven member having an engaging member thereon in radial alignment with said drive member engaging member, an arcuate spring member arranged under predetermined tension in engagement with said engaging members for providing a driving connection between said drive and driven members through said spring, means including a pivotally mounted operating arm arranged for operating a limit device on actuation thereof, means including radially movable guided segmental diaphragm cam members mounted for movement outwardly or inwardly on relative circumferential movement of said engaging members, and means for biasing said operating arm into engagement with said diaphragm cam members for operation of a limit device on relative rotational movement between said engaging members beyond a predetermined value.

4. A coupling overload device for transmitting torque in either direction of rotation and for controlling a limit device above a predetermined maximum transmitted torque including a drive member having an engaging member thereon, a driven member having an engaging member thereon in radial alignment with said drive member engaging member, said engaging members having radially aligned axial grooves in both sides thereof, an arcuate spring member arranged with the ends thereof biased circumferentially apart under predetermined tension in engagement with said grooves in both sides of said engaging members for providing a driving connection between said drive and driven members through said spring and for maintaining said engaging members in alignment below a predetermined maximum torque, means including a radially expansible diaphragm cam arranged for radial movement thereof outwardly or inwardly on relative rotational movement of said engaging members, means including a pivotally mounted operating arm arranged to operate a limit device on actuation thereof, and means for biasing said operating arm into engagement with said diaphragm cam for operation of a limit device on relative rotational movement between said engaging members.

5. A coupling overload device for transmitting torque in either direction of rotation and for controlling a limit device above a predetermined maximum torque including a drive member, a driven member, an arcuate spring member arranged under predetermined tension in engagement with said drive and driven members for providing a driving connection therebetween through said spring, means including radially movable guided segmental diaphragm cam members mounted for movement outwardly or inwardly on relative rotational movement of said drive and driven members, complementary guide slots in said diaphragm members extending inwardly from each of two opposite side edges of said diaphragm members and arranged in alignment in adjacent edges of adjacent diaphragm members, guide elements slidably arranged in said guide slots for maintaining said diaphragm members in radial alignment, means including a pivotally mounted operating arm arranged to operate a limit device on actuation thereof, and means for biasing said operating arm into engagement with said diaphragm cam members for operation of a limit device on relative rotational movement between said drive and driven members above a predetermined transmitted torque.

6. A coupling overload device for transmitting torque in either direction of rotation and for controlling a limit device above a predetermined maximum transmitted torque including a drive member having an engaging member thereon, a driven member having an engaging member thereon in radial alignment with said drive member engaging member, an arcuate spring member arranged under predetermined tension in engagement with said engaging members for providing a driving connection between said drive and driven members through said spring, means including a pivotally mounted operating arm arranged to operate a limit device on actuation thereof, means including radially movable guided segmental diaphragm cam members mounted for movement outwardly or inwardly on relative rotational movement of said engaging members, complementary guide slots in said diaphragm members extending inwardly from each of two opposite side edges of each of said diaphragm members and arranged in alignment in adjacent diaphragm members, guide elements slidably arranged in said guide slots for maintaining said diaphragm members substantially in radial alignment, and means for biasing said operating arm into engagement with said diaphragm cam members for operation of a limit device on relative rotational movement between said engaging members beyond a predetermined value.

7. A coupling overload device for transmitting torque in either direction of rotation and for controlling a limit device above a predetermined maximum transmitted torque including a drive member having an axially projecting engaging member thereon, a driven member having an engaging member thereon in radial alignment with said drive member engaging member, an arcuate spring member arranged under predetermined tension in engagement with said engaging members for providing a driving connection between said drive and driven members through said spring and providing for expansion of said spring and relative rotational movement between said drive and driven members above a predetermined maximum transmitted torque, means including a pivotally mounted operating arm arranged to operate a limit device on actuation thereof, means including a radially expansible diaphragm cam mounted for radial movement outwardly or inwardly on relative rotational movement of said engaging members, and means for biasing said operating arm into engagement with said diaphragm cam for operation of a limit device on relative rotational movement between said engaging members beyond a predetermined value.

8. A coupling overload device for transmitting torque in either direction of rotation and for controlling a limit device above a predetermined maximum transmitted torque including a drive member having an engaging member thereon, a driven member having an engaging member thereon in radial alignment with said drive member engaging member, said engaging members having radially aligned axial grooves in both sides thereof, an arcuate spring member arranged with the ends thereof biased circumferentially apart under predetermined tension in engagement with said grooves in both sides of said engaging members for providing a driving connection between said drive and driven members through said spring and for maintaining said engaging members in alignment below a predetermined maximum torque, means including radially expansible guided segmental diaphragm cam members having complementary sliding guiding surfaces arranged in engagement with each other for radial movement thereof outwardly or inwardly on relative rotational movement of said engaging members, means including a pivotally mounted operating arm arranged to operate a limit device on actuation thereof, and means for biasing said operating arm into engagement with said diaphragm cam members for operation of a limit device on relative rotational movement between said engaging members.

9. A coupling overload device for transmitting torque in either direction of rotation and for controlling a limit device above a predetermined maximum transmitted torque including a drive member, a driven member, an arcuate spring member arranged under predetermined tension in engagement with said drive and driven members for providing a driving connection therebetween through said spring and providing for expansion of said spring and relative rotational movement between said drive and driven members above a predetermined maximum transmitted torque, means including radially expansible diaphragm cam members mounted for movement radially outwardly or inwardly on relative rotational movement of said drive and driven members, complementary guide slots in said diaphragm members extending inwardly from each of two opposite side edges of each of said diaphragm members and arranged in alignment in adjacent edges of adjacent diaphragm members, guide elements slidably arranged in said guide slots for maintaining said diaphragm members substantially in radial alignment, means including a pivotally mounted operating arm arranged to operate a limit device on actuation thereof, and means for biasing said operating arm into engagement with said diaphragm cam members for operation of a limit device on relative rotational movement between said drive and driven members above a predetermined transmitted torque.

10. A coupling overload device for transmitting torque in either direction of rotation and for controlling a limit device above a predetermined maximum transmitted torque including a drive member having an engaging member thereon, a driven member having an engaging member thereon in radial alignment with said drive engaging member, an arcuate spring member arranged under predetermined tension in engagement with said engaging members for providing a driving connection between said drive and driven members through said spring, means including a pivotally mounted operating arm arranged to operate a limit device on actuation thereof, means including radially expansible diaphragm cam members mounted for movement radially outwardly or inwardly or relative rotational movement of said engaging members, complementary guide slots in said diaphragm members extending inwardly from each of two opposite side edges of each of said diaphragm members and arranged in alignment in adjacent edges of adjacent diaphragm members, guide elements slidably arranged in said guide slots for maintaining said diaphragm members substantially in radial alignment, and means for biasing said operating arm into engagement with said diaphragm cam members for operation of a limit device on relative rotational movement between said engaging members beyond a predetermined value.

11. A coupling overload switch operating device for transmitting torque in either direction of rotation and for controlling an electric circuit above a predetermined maximum transmitted torque including a drive member having an axially projecting engaging member thereon, a driven member having an engaging member thereon in radial alignment with said drive member engaging member, an arcuate spring member arranged with the ends thereof biased circumferentially apart under predetermined tension in engagement with said engaging members for providing a driving connection between said drive and driven members through said spring and for maintaining said engaging members in alignment below a predetermined maximum torque, means including a pivotally mounted operating arm for operating a limit switch on actuation thereof beyond a given free travel in opposite directions, a plurality of links pivotally mounted on said drive member and having guide pins thereon for transmitting relative rotational movement between said engaging members, means including radially movable guided segmental diaphragm cam members mounted on said guide pins for moving said diaphragm members outwardly or inwardly on relative rotational movement of said engaging members, complementary guide slots in said diaphragm members extending inwardly from each of two opposite side edges of each of said diaphragm members and arranged in alignment in adjacent edges of adjacent diaphragm members, guide elements slidably arranged in said guide slots for maintaining said diaphragm members in radial alignment, and means for biasing said switch operating arm into engagement with said diaphragm cam members for operation on relative rotational movement between said engaging members.

12. A coupling overload switch operating device for transmitting torque in either direction of rotation and for controlling an electric circuit above a predetermined maximum transmitted torque including a drive member having a drive plate with an axially projecting engaging member thereon, a driven member formed as a drum and having an axially projecting engaging member thereon in radial alignment with said drive member engaging member, said engaging members having radially aligned axial grooves in both sides thereof, an arcuate spring member arranged with the ends thereof biased circumferentially apart under predetermined tension in engagement with said grooves in both sides of said engaging members for providing a driving connection between said drive and driven members through said spring and for maintaining said engaging members in alignment below a predetermined maximum torque, a plurality of angularly extending slots in said driven member drum, means including a pivotally mounted operating arm for operating a limit switch on actuation thereof beyond a given free travel in opposite directions, a plurality of links pivotally mounted on said drive plate and having guide pins thereon extending through said angularly extending slots in said driven member drum for transmitting relative circumferential movement between said engaging members, means including radially movable guided segmental diaphragm cam members mounted on said guide pins and having complementary sliding guiding surfaces arranged in engagement with each other for moving said diaphragm members outwardly or inwardly on relative circumferential movement of said engaging members, complementary guide slots in said diaphragm members extending inwardly from each of two opposite side edges of each of said diaphragm members and arranged in alignment in adjacent edges of adjacent diaphragm members, guide elements slidably arranged in said guide slots for maintaining said diaphragm members in radial alignment, and means for biasing said switch operating arm into engagement with said diaphragm cam members for operation on relative rotational movement between said engaging members beyond a predetermined value.

HUGH M. STEPHENSON.

REFERENCES CITED

The following references are of record in the file of this patent:

UNITED STATES PATENTS

| Number | Name | Date |
|---|---|---|
| 1,714,105 | Ramsdell | May 21, 1929 |
| 1,996,849 | Bauer | Apr. 9, 1935 |
| 2,003,115 | Grohn | May 28, 1935 |
| 2,134,488 | Poitras et al. | Oct. 25, 1938 |
| 2,144,769 | Melmer | Jan. 24, 1939 |
| 2,281,432 | Grohn | Apr. 28, 1942 |

Certificate of Correction

Patent No. 2,461,298. February 8, 1949.

HUGH M. STEPHENSON

It is hereby certified that error appears in the printed specification of the above numbered patent requiring correction as follows:

Column 5, line 57, claim 6, before the word "diaphragm" insert *edges of adjacent*; and that the said Letters Patent should be read with this correction therein that the same may conform to the record of the case in the Patent Office.

Signed and sealed this 23rd day of August, A. D. 1949.

[SEAL]

THOMAS F. MURPHY,
*Assistant Commissioner of Patents.*